Oct. 29, 1940. W. J. HOOPER 2,219,813
FAUCET CONNECTOR
Filed May 6, 1940
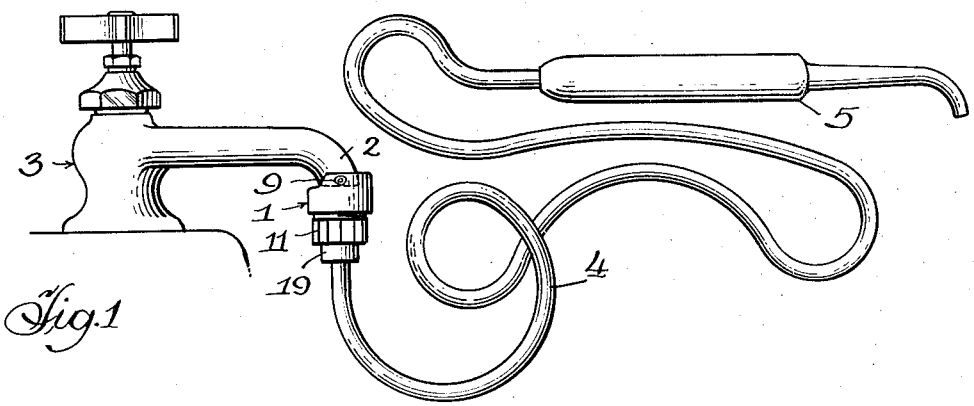
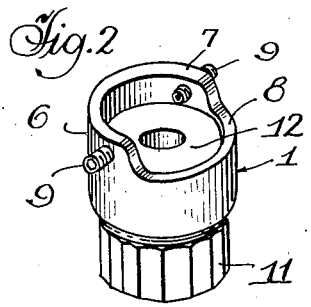
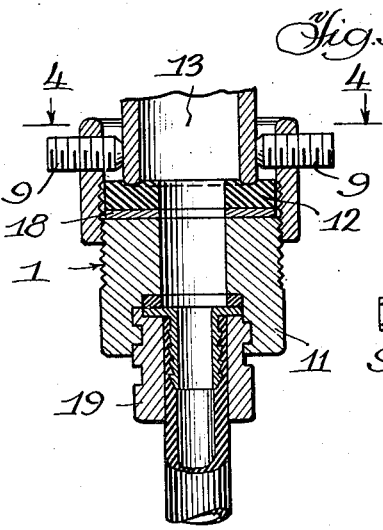
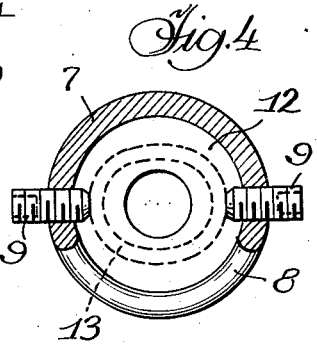
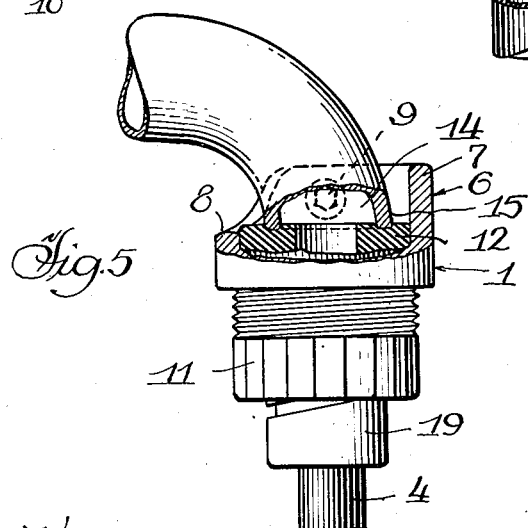
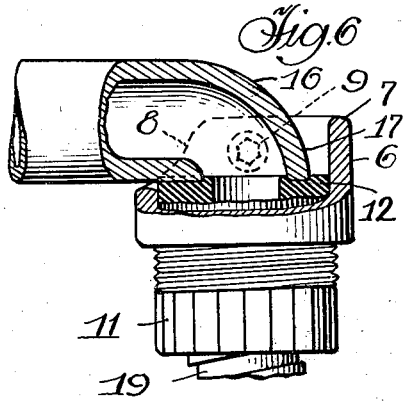
Witness:
Chas. J. Koursh
INVENTOR.
William J. Hooper,
BY Parkinson & Lane
ATTORNEYS.

Patented Oct. 29, 1940

2,219,813

UNITED STATES PATENT OFFICE 2,219,813

FAUCET CONNECTOR

William J. Hooper, Elsah, Ill., assignor to said William J. Hooper and Harold A. Hooper, Chicago, Ill., jointly Application May 6, 1940, Serial No. 333,580

1 Claim. (Cl. 285—143)

The present invention relates to a faucet connector adapted to be adjustably but securely mounted on faucets for the purpose of connecting to and intermittently or continuously supplying water or other fluid from the nozzle of the faucet to a dental syringe, douche or other spray.

In the prior types of faucet connectors now in use, considerable difficulty is had in first applying and then retaining the connector on the faucet without leakage, particularly when the fluid from the faucet is under any appreciable pressure. In the present embodiment, the connector, when once attached, may be retained on the faucet since the discharge or outlet is of such size that the device affords but little reduction from the normal discharge of the faucet nozzle. Furthermore, by reason of the novel anchoring means, all danger of leakage and accidental displacement is eliminated.

The invention further comprehends a universal connector adapted to be readily applied to and anchored upon faucets having nozzles of different shapes or sizes and lengths, and one which may be quickly and easily applied and when applied, is rigidly held in position without danger of leakage or blowing off, regardless of the pressure of the fluid in the faucet.

The novel embodiment further comprehends a most simplified and efficient connector or attachment that is universally adapted to office, laboratory or home use.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while I have shown therein a preferred embodiment, it is to be understood that the same is susceptible of modification and change, and comprehends other details, arrangements of parts, features and constructions without departing from the spirit of the invention.

In the drawing:

Fig. 1 is a view in side elevation of the novel connector attached to a faucet of any standard construction and to which is connected a hose and dental syringe, douche or other spray.

Fig. 2 is a view in perspective of the novel unit.

Fig. 3 is a view in vertical cross section through the novel unit and showing its means of attachment to the nozzle of faucet.

Fig. 4 is a view in horizontal cross section taken in a plane represented by the line 4—4 of Fig. 3.

Fig. 5 is a view, part in side elevation and part in vertical cross section, of the novel connector unit attached to another form of faucet.

Fig. 6 is a view similar to Fig. 5 but showing another form of faucet to which the connector may be applied.

Fig. 7 is a view in perspective of a key adapted to quickly adjust the set screws for anchoring the connector unit onto a nozzle.

Referring more particularly to the embodiment in the drawing selected to illustrate the novel invention, the faucet connector 1 is shown as mounted on the discharge nozzle 2 of a faucet 3 for attaching or coupling a hose 4 leading to a dental syringe, douche or other spray or the like 5 to the faucet. The novel connector is so constructed and arranged that it may be readily mounted or anchored upon the discharge end or nozzle of a faucet regardless of the contour or cross section of this discharge end; that is, circular, elliptical, polygonal, etc. Furthermore, due to the novel adjustable securing means for anchoring the connector onto the faucet, this connector will accommodate faucets of varying dimensions and through a considerable range in size so that the connector has substantially universal application.

The faucet connector 1 comprises a holder or body member 6 having an upstanding annular flange 7 so interrupted or cut away at 8 to permit the connector to be applied to faucets having nozzles or discharge outlets of practically any contour and regardless of whether the nozzle actually depends as in Figs. 1, 3 and 5, or of contour disclosed as in Fig. 6. In order to securely anchor the connector onto the faucet, the invention comprehends a pair of adjustable anchoring projections, which in the illustrative embodiment, are shown in the form of a pair of set screws 9 threaded in the flange in such manner and location that they are disposed diametrically opposite to each other as clearly shown in Fig. 4. In order to adjust these screws, I propose to use a pair of keys 10 of the type shown in Fig. 7, which keys are inserted in polygonal openings provided in the external faces of these screws. However, these screws may be provided with winged heads, or as the invention comprehends, other manually adjustable means may be provided so that with the connector applied or positioned below the discharge, a simultaneous turning of these screws will quickly, uniformly and securely anchor this connector in position.

After the connector has been anchored onto the faucet, a collar or sleeve 11, preferably threaded and longitudinally adjustable in the threaded lower end of the holder 6, is turned by the operator in a direction to thereby raise the collar or sleeve 11 and the resilient and compressible washer 12 carried thereby, with respect to the holder 6, until the washer is pressed against the lower edge of the nozzle with such pressure as to tightly seat and completely seal the connector onto the faucet.

Figs. 3 and 4 show the connector applied to a nozzle 13 of the type now in common use in which this nozzle is of substantially elliptical shape in cross section, although it may be of circular contour. In Fig. 5, the nozzle 14 may be of elliptical or circular shape, but with the outer surface flared or inclined at 15, while in Fig. 6 the faucet has a nozzle 16 which does not depend and which is flared or inclined at 17 in such manner that connectors of the types now in general use and which must be pressed or forced up and over the end of a depending nozzle, could not be employed. The present invention, due to the interrupted flange 7, may be placed over the discharge end or nozzle of a faucet by laterally slipping the connector over this end. Furthermore, by employing but two attaching members or set screws spaced substantially 180° apart, there is no possibility of the connector being tilted or inclined from its normal operative position when these screws are tightened as to thereby prevent a tight sealing contact by the washer 12. By simultaneously tightening these two screws, uniform anchoring pressure is applied to the exterior of the faucet.

In Fig. 3, a washer 18 of metal or other substantially rigid material is shown between the upper surface of the sleeve or collar 11 and the resilient washer 12, although this resilient washer may be carried directly upon the upper surface of this sleeve. After the connector has been secured in position and the sleeve or collar adjusted to form a leak-proof seal, the hose 4 is detachably coupled to the connector 1 by means of a threaded coupling 19 adapted to be received in the threaded lower end of the collar or sleeve 11.

Having thus disclosed the invention, I claim:

A connector for ready attachment to the discharge nozzle of a faucet of any standard construction, comprising an annular shaped body member adapted to be connected to the faucet and having a substantially semi-circular upstanding portion at one end of the ring, set screws adjustably mounted in the holder at diametrically opposite points and adapted to be adjusted into contact with the opposite sides of the faucet, a connecting member adjustably connected with the holder and a washer carried on said member, said member being adapted to be rotated by the operator after the holder is anchored in position on the faucet for raising the washer into tight seating and sealing contact with the discharge end of the faucet.

WILLIAM J. HOOPER.